Figure 1:
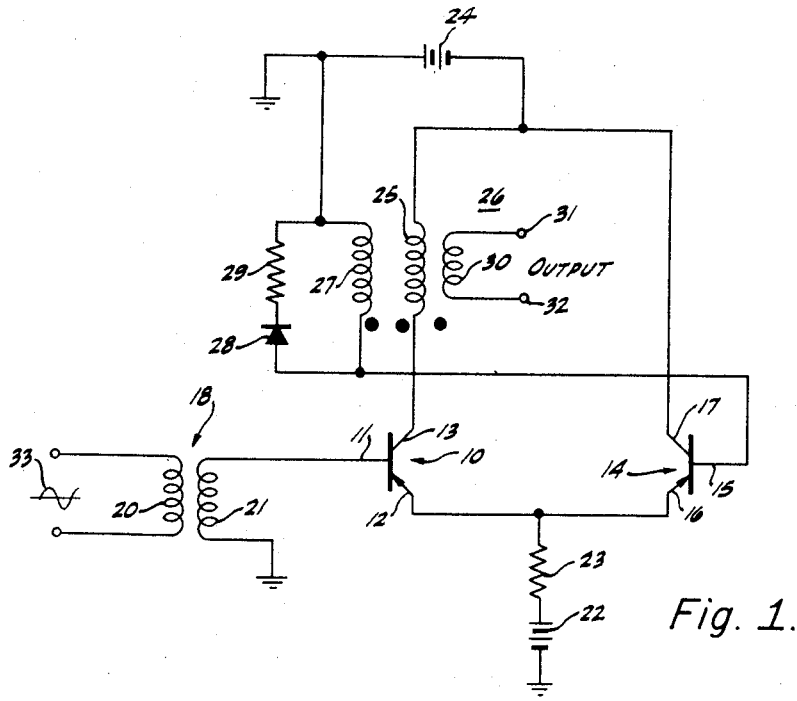

Oct. 11, 1960     R. A. DAY     2,956,177

VOLTAGE COMPARING CIRCUIT

Filed April 24, 1957

INVENTOR.
Richard A. Day,

BY

AGENT.

United States Patent Office 2,956,177
Patented Oct. 11, 1960

2,956,177

VOLTAGE COMPARING CIRCUIT

Richard A. Day, Norwalk, Calif., assignor to Hughes Aircraft Company, Culver City, Calif., a corporation of Delaware Filed Apr. 24, 1957, Ser. No. 654,966

8 Claims. (Cl. 307—88.5)

The present invention relates to voltage comparators and more particularly to a voltage comparing circuit for providing an output signal when the instantaneous amplitude of a varying signal becomes equal to a reference signal level, and is changing in a predetermined direction.

In many applications wherein alternating current (A.C.) signals are used it is necessary to obtain an accurate time reference for the periodic occurrence of a particular portion of the A.C. signal. Since the exact peak of an A.C. signal is often difficult to locate because of the slow rate of change of amplitude, it may be advantageous to use the large rate of change which takes place when the signal is crossing its zero reference axis to provide a timing reference. In particular, in the use of magnetic storage devices, such as drums or tapes, wherein an A.C. signal is derived from signals such as pulses stored on the device, it is necessary to obtain a signal whenever a particular portion of the A.C. signal recurs. This is also true in conjunction with a position indicating device such as a resolver which provides an A.C. output signal in response to the physical movement of a member.

Prior art voltage comparing circuits such as the Schmitt trigger circuit have been used to provide an indication of the crossing of the signal reference axis by an A.C. signal. If transistors are used in such circuits it is found that the circuit becomes unstable if substantial temperature variations are encountered. In a Schmitt trigger circuit using transistors, the voltage at which the circuit triggers is dependent upon the grounded-emitter current amplification factor and also upon the $I_{co}$ (or D.C. collector current for zero emitter current) of the transistors.

Accordingly, it is an object of the present invention to provide an improved voltage comparing circuit using semiconductor amplifiers.

Another object of the present invention is to provide an improved voltage comparator which is adapted to generate an output signal in response to the amplitude of an input A.C. signal becoming equal to a predetermined reference voltage.

A further object of the present invention is to provide a voltage comparing circuit which may be utilized to provide an output signal only when the amplitude of an A.C. signal becomes equal to the amplitude of a reference signal and is changing in a predetermined direction.

In accordance with the present invention a first transistor is adapted to have its state of conduction changed when the amplitude of a varying input signal applied to the first transistor passes through a predetermined value of signal amplitude. A cross-coupling network couples the first transistor with a second transistor in a manner such that when the first transistor is rendered nonconductive the second transistor is rendered conductive, and when the first transistor is rendered nonconductive the second transistor is rendered conductive. The two transistors are further so interconnected that the second transistor insures rapid turn-on and turn-off of the first transistor in response to the amplitude of the input signal passing through the reference level. A clamping network may be included in the cross-coupling network to provide a low impedance path when the first transistor is changing its state of conduction in one direction and a high impedance path when the first transistor changes its state of conduction in the opposite manner. Thus if the cross-coupling network includes an inductive element which is adapted to provide an output signal, a small signal may be developed when the first transistor is rendered conductive and a large signal provided when the first transistor is rendered nonconductive (or vice versa). Since the circuit is arranged in a manner such that the turn-on and turn-off time of the first transistor is relatively short, and such that an output signal is provided either when the first transistor is rendered conductive or when it is rendered nonconductive, an accurate indication of the change of the amplitude of the input signal through a predetermined signal level may be provided.

The novel features that are considered characteristic of the voltage comparing circuit of the present invention are set forth with particularity in the appended claims. The invention itself, however, both as to its organization and method of operation as well as additional advantages and objects thereof will be best understood from the following description when read in connection with the accompanying drawing and in which, Fig. 1 is a schematic circuit diagram of a voltage comparing circuit of the present invention; and Fig. 2 is a graphical representation of current and voltage versus time illustrating the operation of the circuit of Fig. 1.

Figure 2:
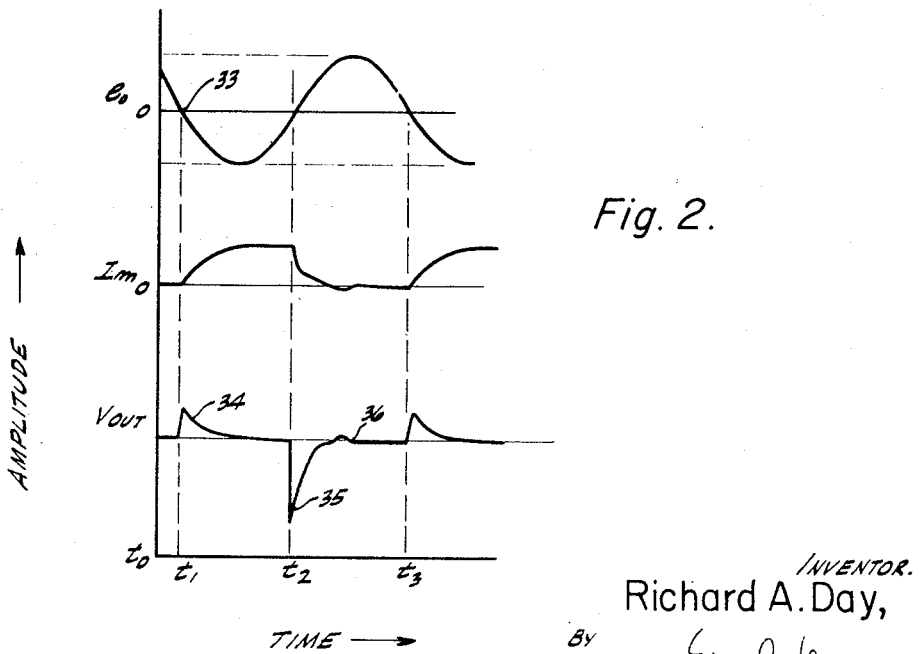

Referring now to the drawing and in particular to Fig. 1, a pair of transistors of the same conductivity type is shown for purposes of illustration as a first PNP transistor 10 having a base electrode 11, an emitter electrode 12, and a collector electrode 13, and a second PNP transistor 14 having a base electrode 15, an emitter electrode 16, and a collector electrode 17. A signal input circuit 18 is coupled to the base 11 of the first transistor 10 and is adapted to apply varying signals such as an A.C. signal thereto. To reduce the base impedance of the first transistor and thus decrease the effects of temperature on the circuit, it may be advantageous to utilize a transformer input circuit and to this end a primary winding 20 is illustrated as being adapted to receive an input signal and apply it to a secondary winding 21 which is connected between the base 11 of the first transistor 10 and a point of fixed reference potential which will be referred to as ground.

The emitters 12 and 16 of the two transistors are connected together and coupled to the positive terminal of a first source of direct current (D.C.) potential, shown for purposes of illustration as a battery 22, through a common emitter resistor 23. The negative terminal of the battery 22 is connected to ground. The collectors 13 and 17 of the two transistors are coupled to the negative terminal of a second battery 24 having its positive terminal grounded, with the collector 17 of the second transistor being connected directly to the negative terminal of the battery 24 and the collector 13 of the first transistor being coupled to the negative terminal through a first inductive element 25 which may be the primary winding of a transformer 26. The base 15 of the second transistor 14 is coupled to ground through a second inductive element 27 which may be considered a first secondary winding of the transformer 26. The base 15 is also coupled to ground through a diode 28 connected in series with a resistor 29, with the diode-resistor network shunting the second inductive element 27. Thus a low impedance base circuit is provided for the second transistor 14, which reduces the effects of temperature variations. As shown in the drawing, the anode of the diode 28 is connected to the base 15, but as will be explained later, the cathode may be connected to the base.

As shown schematically in the drawing by the dots the phase relationship between the primary winding 25 and the first secondary winding 27 of the transformer 26 is such that when a positive going signal appears at the collector electrode 13 of the first transistor 10, a positive going signal is applied to the base 15 of the second transistor 14. It is to be noted that with the anode of the diode 28 connected to the base 15 of the second transistor, the secondary winding 27 of the transformer 26 is essentially short circuited in one direction since the diode 28 will be forwardly biased and is open circuited in the opposite direction since the diode is then backwardly biased. Since the diode-resistor network effectively short circuits the primary winding in one direction, it could be placed directly in parallel with the primary winding.

A signal pickup winding 30 is placed in an energy exchanging relationship with the primary winding 25, and thus may be considered a second secondary winding of the transformer 26. It serves to provide output signals to any load element which may be connected between a pair of signal output terminals 31 and 32. It is of course to be understood that any suitable output circuit could be used, and that a signal pickup winding is shown only for purpose of illustration.

In Fig. 2 the voltage and current wave forms of various points of the circuit of Fig. 1 are shown schematically as a function of time to aid in the description of the operation of the circuit. At a time when an input signal 33 which may be a sine wave as shown is applied to the signal input circuit 18 and is at a certain positive potential with respect to ground, the first transistor 10 will be nonconductive and the second transistor 14 will be conductive if a sufficiently large signal is applied to the base 11 of the first transistor. This is true since the base-emitter junction of the first transistor will be backwardly biased and the emitter-base junction of the second transistor will be forwardly biased. Thus since the first transistor 10 is nonconductive at a time to the magnetizing current identified as $I_m$ flowing through the primary winding 25 of the transformer 26 will be zero. Since there is no change of current through the transformer primary winding 25 at time to the output signal indicated as $V_{out}$ will be zero.

At a time $t_1$ when the amplitude of the input signal 33 passes through the zero reference axis, the first transistor 10 will be rendered conductive, emitter-collector current will flow, and the potential of the collector 13 tends to rise. This positive change in collector potential of the first transistor 10 will be applied to the base 15 of the second transistor thus rendering the second transistor nonconductive, switching its current to the first transistor 10. When the first transistor is thus rendered conductive a magnetizing current $I_m$ will begin to flow through the primary winding 25 causing a corresponding positive output voltage 34 in the pickup winding 30 across which the load element is concerned. Since the secondary winding 27 is essentially short-circuited through the diode and resistor network 28 and 29, the major portion of the current induced by the change of emitter-collector current of the first transistor 10 flows through the diode-resistor network. Thus an output signal of small amplitude is provided between the signal output terminals 31 and 32.

When the input signal 33 is approaching the zero reference axis from the negative direction at a later time $t_2$, the magnetizing current of the primary winding 25 has reached its quiescent value and the output pulse associated with the current change of the primary winding 25 has ceased. The first transistor 10 will still be conductive and the second transistor 14 will be nonconductive. Thus energy is stored in the electromagnetic field associated with the current flow through the primary winding 25.

As the amplitude of the input signal 33 passes through the zero reference axis in a positive going direction the first transistor is rendered nonconductive and the current flow through the primary winding 25 tends to stop and the potential of the collector 13 goes negative. This negative change in potential is applied to the base 15 of the second transistor rendering it conductive which insures rapid turn-off of the first transistor 10. The sudden decrease in current flow through the primary winding 25 causes a correspondingly large negative going output voltage 35 to be generated in the pickup winding 30. This results since the diode 28 is backwardly biased at a time $t_2$ when the electromagnetic field established by the magnetizing current $I_m$ collapses, and the energy stored in the field is utilized to provide the large output signal 35.

As the magnetizing current flow through the primary winding 25 approaches zero as a result of the collapse of the electromagnetic field there tends to be an overshoot of the zero point due to circuit capacities creating a resonant condition with the inductor. Thus a small output signal 36 may tend to appear. This is minimized, however, since the attempted overshoot will render the diode 28 again conductive and establish a short circuit path through the diode 28 and resistor 29.

At a time $t_3$ when the circuit has recovered to its initial condition which prevailed at a time $t_1$, the above described action will recur.

If the impedance of the resistor 29 is small in relation to the impedance of the load element connected between the signal output terminals 31 and 32, the relative amplitude of the first output signal 34 will be small compared to that of the second output signal 35. Therefore, an accurate indication of the crossing of the zero axis by the input signal 33 in a positive going manner is provided. It is of course evident that if the polarity of the diode 28 were reversed the above described action would be essentially the same except that the amplitude of the first output signal 34 would be much larger than that of the second output signal 35 and an indication would be provided of the crossing of the zero axis by the input signal 33 in a negative going direction.

It is to be noted of course that the wave forms shown in Fig. 2 illustrate the situation when a resistive load is connected between the signal output terminals 31 and 32. A slightly different shaped output signal is provided if other types of load elements are connected in the signal output circuit. Regardless of the type of signal output circuit utilized, however, the voltage comparing circuit of the present invention will provide an output signal when the amplitude of an input signal passes through a reference potential and is changing in a selected direction.

While it is to be expressly understood that the circuit specifications of the voltage comparing circuit of the present invention may vary according to the design for any particular application, the following specifications for the circuit of Fig. 1 are included by way of example only. The transformer windings used were in a ratio of 1 to 2 for primary 25 to secondary 27, but could of course be varied.

Transistors 10 and 14 ___ General Electric Type 2N136.
Diode 28 _____ Hughes Type 2180.
Resistor 23 _____ 300° ohms.
Resistor 29 _____ 51 ohms.
Battery 22 _____ +30 volts.
Battery 24 _____ −4 volts.

There has thus been disclosed a voltage comparing circuit which utilizes transistors and which provides an accurate indication of the amplitude of a varying input signal crossing a reference axis, and which may be adapted to provide selectivity of the direction in which the input signal is crossing the axis.

What is claimed is:
1. A voltage comparing circuit which comprises, a first transistor having a control electrode and an emitter-collector circuit, an inductor having one end connected to one end of said emitter-collector circuit, first bias means coupled to the other end of said inductor and being supplied with current only when said transistor is conductive, a signal output circuit coupled to said inductor, second bias means coupled to the other end of said emitter-collector circuit for establishing a reference potential and a source of input signals coupled to said control electrode to render said transistor conductive when an input signal applied to said control electrode is of a first polarity with respect to said reference potential and to render said transistor nonconductive when said signal is of the opposite polarity, whereby energy is stored in said inductor when said transistor is conductive and is dissipated to said signal output circuit when said transistor is rendered nonconductive, and a feedback transistor having an emitter-collector circuit coupled to said emitter-collector circuit of said first transistor to reduce the turn-off time of said first transistor.

2. A voltage comparing circuit comprising in combination, a first transistor having a control electrode, and emitter electrode, and a signal output electrode, a first inductor connected to said signal output electrode, a feedback transistor coupled with said first transistor and having a control electrode, emitter electrode, and collector electrode, a second inductor connected to the control electrode of said feedback transistor and coupled in energy exchanging relationship with said first inductor for controlling the state of conduction of said second transistor, a signal output circuit including a third inductor coupled in energy exchanging relationship with said first inductor, and means including a signal input circuit coupled to the control electrode of said first transistor for rendering said first transistor conductive when an input signal is of a first polarity and for rendering said first transistor nonconductive when said input signal is of a second polarity, whereby the current flow through said first inductor changes when the amplitude of said input signal becomes equal to said predetermined amplitude, thereby to provide an output signal.

3. A voltage comparing circuit which comprises, a first transistor having a base, a collector, and an emitter electrode, an energy storing element serially connected with the emitter-collector circuit of said first transistor, a signal input circuit coupled to the base of said first transistor for rendering said first transistor conductive when an input signal is of a first polarity and rendering said first transistor nonconductive when said input signal is of a second polarity, a second transistor having a base, a collector, and an emitter electrode, a cross-coupling network coupled between the base of said second transistor and said element and adapted to convey voltage changes at the collector of said first transistor to the base of said second transistor, means interconnecting said emitters directly, and a signal output circuit electromagnetically coupled to said energy storing element for providing an output signal in response to a change of conduction of said first transistor.

4. A voltage comparing circuit which comprises, a first transistor having a base electrode, an emitter electrode, and a collector electrode, a second transistor having a base electrode, an emitter electrode, and a collector electrode, a first inductor serially connected with the emitter-collector circuit of said first transistor, a second inductor serially connected with the emitter-base circuit of said second transistor and electromagnetically coupled with said first inductor, a diode connected in parallel with said second inductor to short circuit said second inductor when said first transistor is conductive, a signal output circuit coupled to said first inductor, means including a signal input circuit adapted to render said first transistor conductive when the level of an input signal applied thereto is greater than a predetermined amplitude and to render said first transistor nonconductive when the level of said signal is less than said predetermined amplitude, whereby energy is stored in said first inductor when said first transistor is rendered conductive and stored energy is provided to the signal output circuit when said first transistor is rendered non-conductive.

5. A voltage comparing circuit adapted to provide an output signal when the amplitude of a varying input signal is equal to a predetermined signal level and which comprises, first and second transistors, each having a base, a collector, and an emitter electrode, means for applying the varying signal to the base of said first transistor for controlling the conduction thereof, a first inductor connected to the collector of said first transistor, a second inductor connected to the base of said second transistor and electromagnetically coupled with said first inductor to convey voltage changes at the collector of said first transistor to the base of said second transistor, a signal output circuit coupled with said first inductor, and bias means adapted to render said first transistor conductive when the level of said varying signal is greater than a predetermined amplitude, thereby to permit current flow through said first inductor and store energy therein, and to render said first transistor nonconductive when the level of said varying signal is less than said predetermined amplitude, whereby the energy stored in said first inductor provides a signal to said signal output circuit.

6. A voltage comparing circuit as defined in claim 5 and including a diode connected in parallel with said second inductor for providing a low impedance path to current when said first transistor is conductive.

7. A voltage comparing circuit for providing a first output signal when the level of an input signal becomes equal to a predetermined amplitude and is changing in one direction, and a second output signal of greater amplitude than the first signal when the level of the input signal becomes equal to the predetermined amplitude and is changing in a direction which is opposite to the first mentioned direction, said circuit comprising, first and second transistors, each having a base electrode, an emitter electrode, and a collector electrode, a signal input circuit connected to the base electrode of said first transistor for applying the input signal to said first transistor, a first inductor connected to the collector electrode of said first transistor, a second inductor connected to the base electrode of said second transistor and electromagnetically coupled with said first inductor for applying changes in the potential of the collector electrode of said first transistor to the base electrode of said second transistor, means interconnecting said emitter electrodes, bias means coupled to said transistors and adapted to render said first transistor conductive when the level of the input signal is less than said predetermined amplitude, thereby to provide current to said first inductor, and to render said first transistor nonconductive when the level of the input signal is greater than said predetermined amplitude, a signal output circuit coupled with said first inductor for providing the first output signal when said first transistor is being rendered conductive and the second output signal when said first transistor is being rendered nonconductive, and a diode connected in parallel with said second inductor for providing a low impedance energy dissipating circuit during the occurrence of the first output signal, thereby to render the first output signal relatively small in comparison to the second output signal.

8. A voltage comparing circuit which comprises first and second PNP junction transistors, each having a base, a collector, and an emitter, bias means adapted to establish a point of reference potential and a first point of potential which is positive with respect to said reference potential and a second point of potential which is negative with respect to said reference potential, a signal input circuit including a transformer having a primary winding adapted to receive varying input signals and a secondary winding connected between the base of said first transistor and said point of reference potential, a common emitter resistor connected between said first point of potential and each of said emitters, a first inductor connected between the collector of said first transistor and said second point of potential, a second inductor connected between the base of said second transistor and said point of reference potential and coupled in energy exchanging relationship with said first inductor, a diode connected in parallel with said second inductor, and a signal output circuit including a third inductor coupled in an energy exchanging relationship with said first inductor.

References Cited in the file of this patent

UNITED STATES PATENTS

| | | |
|---|---|---|
| 2,594,336 | Mohr | Apr. 29, 1952 |
| 2,760,088 | Pittman et al. | Aug. 21, 1956 |
| 2,783,384 | Bright et al. | Feb. 26, 1957 |
| 2,850,648 | Elliott | Sept. 2, 1958 |

UNITED STATES PATENT OFFICE

CERTIFICATE OF CORRECTION

Patent No. 2,956,177

October 11, 1960

Richard A. Day

It is hereby certified that error appears in the printed specification of the above numbered patent requiring correction and that the said Letters Patent should read as corrected below.

Column 3, line 28, after "time" insert -- $t_o$ --; lines 38 and 42, for "to", each occurrence, read -- $t_o$ --; same column 3, line 56, for "concerned" read -- connected --; column 4, line 61, for "300°" read -- 3000 --.

Signed and sealed this 11th day of April 1961.

(SEAL)

Attest:

ERNEST W. SWIDER
Attesting Officer

ARTHUR W. CROCKER
Acting Commissioner of Patents